US010677538B2

(12) United States Patent
Shin

(10) Patent No.: US 10,677,538 B2
(45) Date of Patent: Jun. 9, 2020

(54) INDIRECT HEAT EXCHANGER

(71) Applicant: Baltimore Aircoil Company, Inc., Jessup, MD (US)

(72) Inventor: Yoon K. Shin, Ellicott City, MD (US)

(73) Assignee: Baltimore Aircoil Company, Jessup, MD (US)

( * ) Notice: Subject to any disclaimer, the term of this patent is extended or adjusted under 35 U.S.C. 154(b) by 0 days.

(21) Appl. No.: 15/863,196

(22) Filed: Jan. 5, 2018

(65) Prior Publication Data
US 2019/0212075 A1 Jul. 11, 2019

(51) Int. Cl.
*F28F 3/04* (2006.01)
*F28D 1/03* (2006.01)
*F28D 5/02* (2006.01)

(52) U.S. Cl.
CPC ............ *F28F 3/046* (2013.01); *F28D 1/0308* (2013.01); *F28D 5/02* (2013.01); *F28D 1/035* (2013.01); *F28D 1/0333* (2013.01); *F28F 2225/04* (2013.01); *F28F 2230/00* (2013.01); *F28F 2240/00* (2013.01); *F28F 2275/02* (2013.01); *F28F 2275/04* (2013.01); *F28F 2275/06* (2013.01)

(58) Field of Classification Search
CPC .......... F28F 3/046; F28F 3/14; F28F 2225/04; F28F 2230/00; F28F 2275/06
See application file for complete search history.

(56) References Cited

U.S. PATENT DOCUMENTS

| 3,911,843 | A | * | 10/1975 | Stowell | ................ | B21D 53/045 |
| | | | | | | 29/890.042 |
| 4,099,928 | A | | 7/1978 | Norback | | |
| 4,374,542 | A | | 2/1983 | Bradley | | |
| 4,434,112 | A | * | 2/1984 | Pollock | .................... | F28D 5/02 |
| | | | | | | 165/170 |
| 4,518,544 | A | * | 5/1985 | Carter | ..................... | B01J 19/32 |
| | | | | | | 261/112.2 |
| 4,688,631 | A | | 8/1987 | Peze | | |
| D304,715 | S | | 11/1989 | Horvath | | |

(Continued)

FOREIGN PATENT DOCUMENTS

WO 2017215954 A1 12/2017

OTHER PUBLICATIONS

Brentwood, "Low Fouling Film Fill > Shockwave", Accessed Feb. 4, 2019. (http://brentwoodindustries.com/cooling-tower/low-fouling-film-fill/?model_type=7835) (Year:2019).

(Continued)

*Primary Examiner* — Devon Russell
(74) *Attorney, Agent, or Firm* — Fitch, Even, Tabin & Flannery LLP

(57) ABSTRACT

A cassette for use in cassette-type heat exchanger has an inlet and an outlet, and include an upper plate and a lower plate. The upper and lower plates are sealed together around an edge area of the cassette, thereby forming a flow path within the cassette between the inlet and outlet. The plates are formed with a stamped pattern that increases the surface area of the plates as compared to a flat plate surface. The pattern includes a series of weld points whereby the upper and lower plate are welded or bonded together at a point location.

20 Claims, 12 Drawing Sheets

(56) References Cited

U.S. PATENT DOCUMENTS

| | | | |
|---|---|---|---|
| 5,050,671 A * | 9/1991 | Fletcher | F28D 1/0308 165/148 |
| 5,944,094 A | 8/1999 | Kinney, Jr. | |
| 6,308,702 B1 * | 10/2001 | Huyghe | F24H 3/105 126/110 B |
| 6,516,874 B2 | 2/2003 | Mathur | |
| 6,684,943 B2 | 2/2004 | Dobbs | |
| D574,339 S | 8/2008 | Honjo | |
| 7,552,760 B1 | 6/2009 | Ben Lakhdhar | |
| D613,258 S | 4/2010 | Walker | |
| D615,927 S | 5/2010 | Kuriki | |
| D699,690 S | 2/2014 | Hsu | |
| 8,684,071 B2 | 4/2014 | Andersson | |
| 8,833,741 B2 | 9/2014 | Mockry | |
| 9,033,026 B2 | 5/2015 | Persson | |
| 9,057,563 B2 | 6/2015 | Carter | |
| 9,057,564 B2 | 6/2015 | Carter | |
| 9,389,028 B2 | 7/2016 | Dahlberg | |
| D764,423 S | 8/2016 | Dempster | |
| 9,453,687 B2 | 9/2016 | Kwon | |
| 10,066,879 B2 | 9/2018 | Wei | |
| 2006/0231241 A1 | 10/2006 | Papapanu | |
| 2009/0025911 A1 | 1/2009 | Chang | |
| 2010/0089560 A1 * | 4/2010 | Shikazono | F28D 1/05366 165/177 |
| 2010/0252247 A1 * | 10/2010 | Smith, III | F28F 1/325 165/181 |
| 2013/0199152 A1 * | 8/2013 | Menheere | F02C 7/10 60/39.511 |
| 2014/0166254 A1 * | 6/2014 | Carter | B01F 3/04 165/166 |
| 2014/0260178 A1 * | 9/2014 | Eleftheriou | F02C 7/08 60/39.511 |
| 2015/0099453 A1 * | 4/2015 | Eleftheriou | F02C 7/08 454/284 |
| 2016/0025422 A1 | 1/2016 | Strange | |
| 2017/0184060 A1 * | 6/2017 | Cho | F02M 26/32 |
| 2018/0283792 A1 | 10/2018 | Shin | |

OTHER PUBLICATIONS

Image of surface pattern of cassette publicly available Nov. 2017; 1 page.

International Search Report in International Application No. PCT/US19/12366, dated May 6, 2019, 10 pages.

Printout of website, HTT, https://www.htt-ag.com/en/, believed to be publicly available at least as early as Nov. 2017, 4 pages.

Printout of website, Transfer, Compact, Efficient and Economical Plate Heat Exchangers, https://www.tranter.com/products/, believed to be publicly available at least as early as Nov. 2017, 8 pages.

SPX, "Cooling Tower Parts: Fill and Drift Eliminators", Accessed Feb. 4, 2019. (https://spxcooling.com/parts/filter/coolingfoll) (Year: 2019).

Design U.S. Appl. No. 29/634,472, filed Jan. 22, 2018; 29 pages.

* cited by examiner

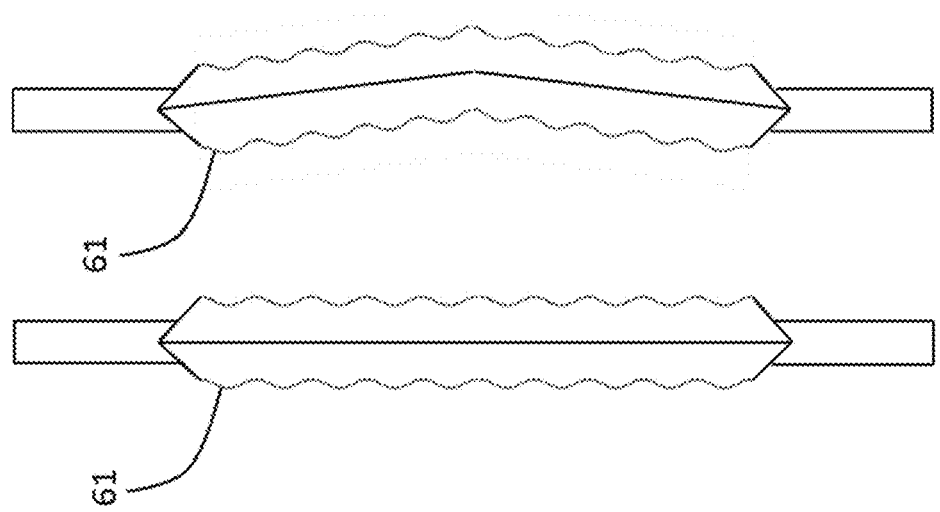
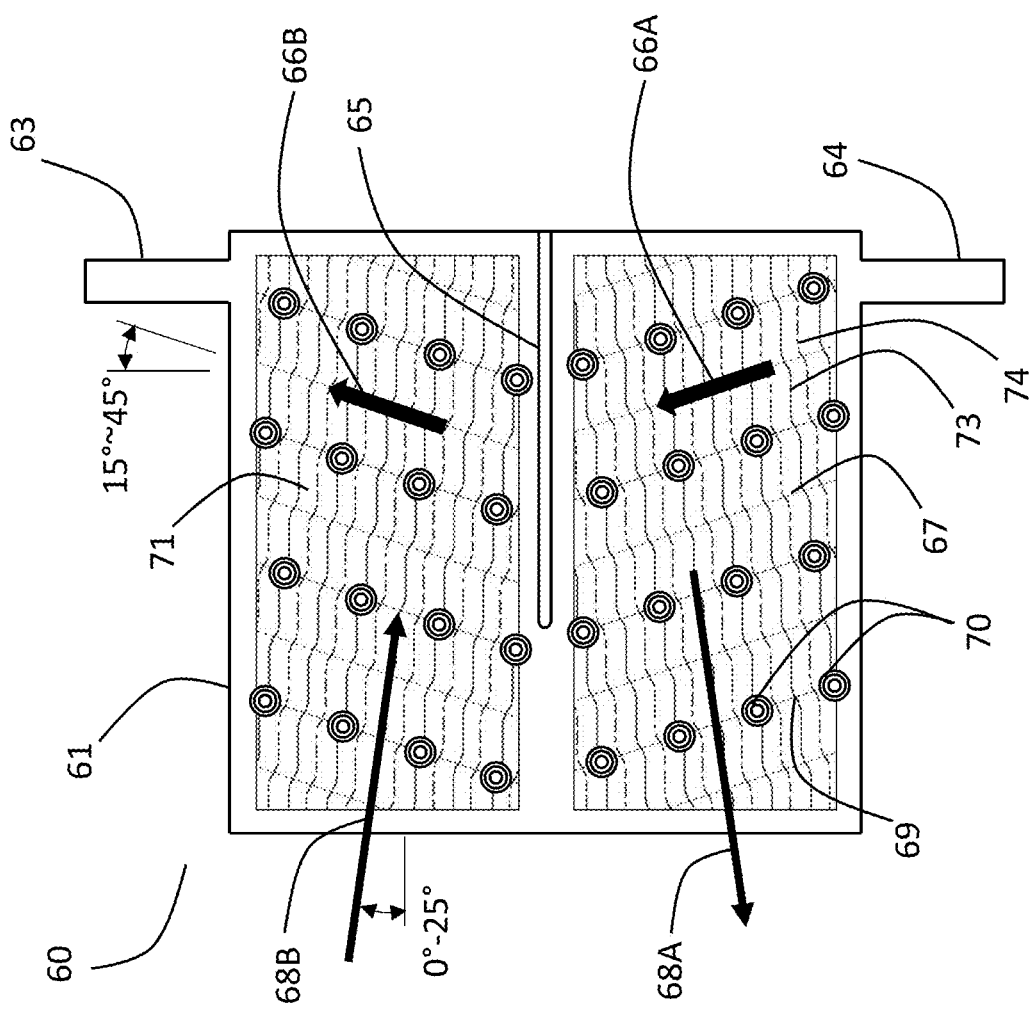
FIG. 4B    FIG. 4C
FIG. 4A

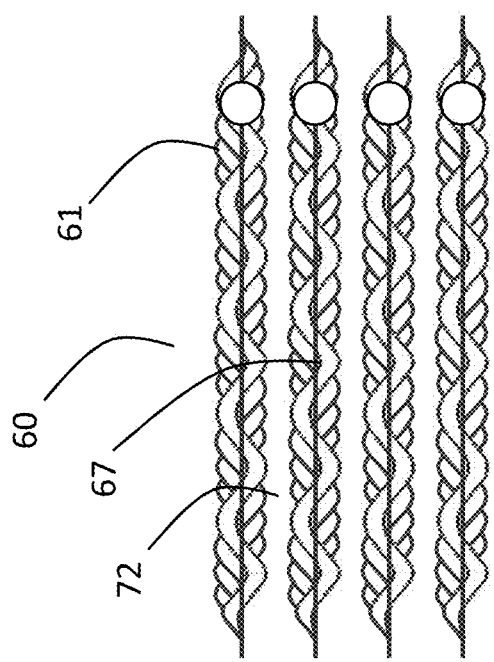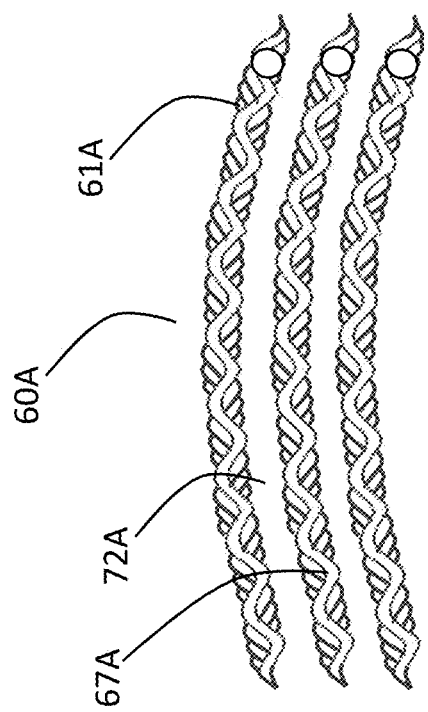

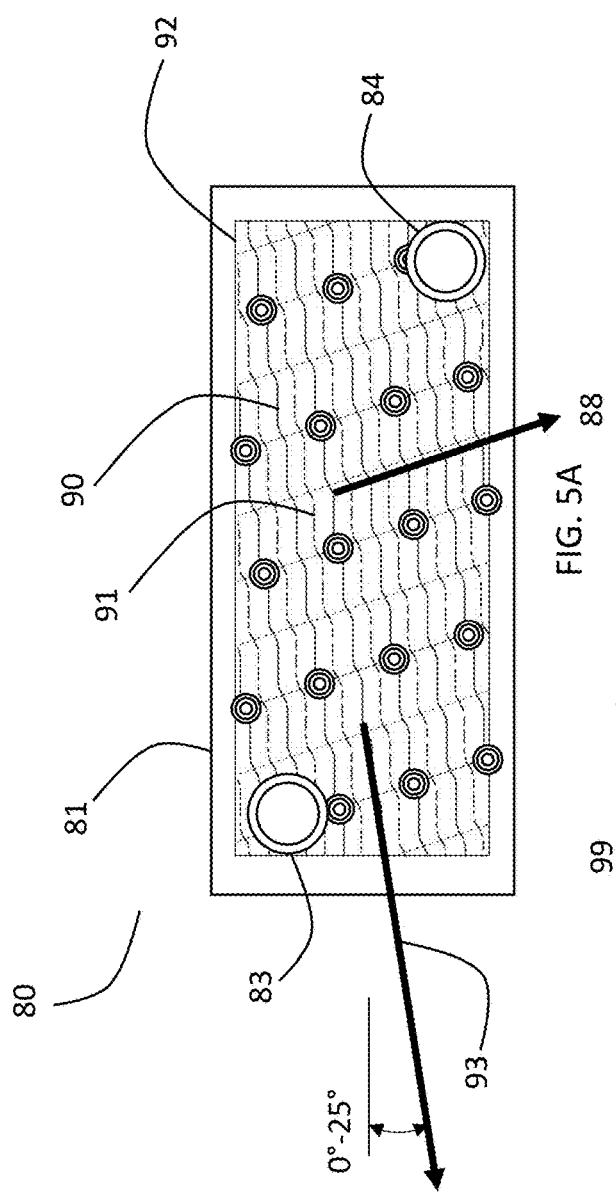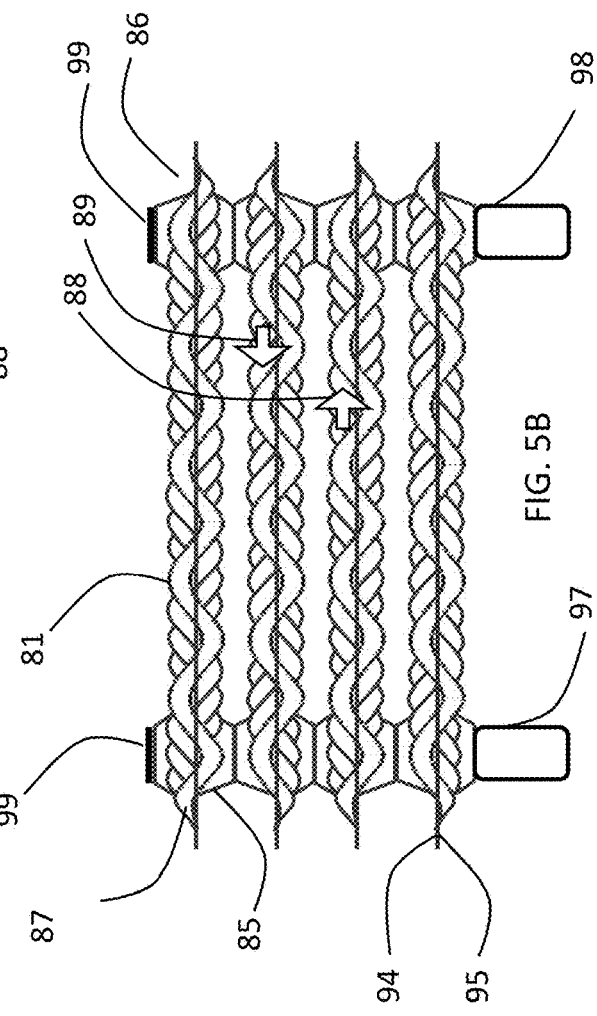

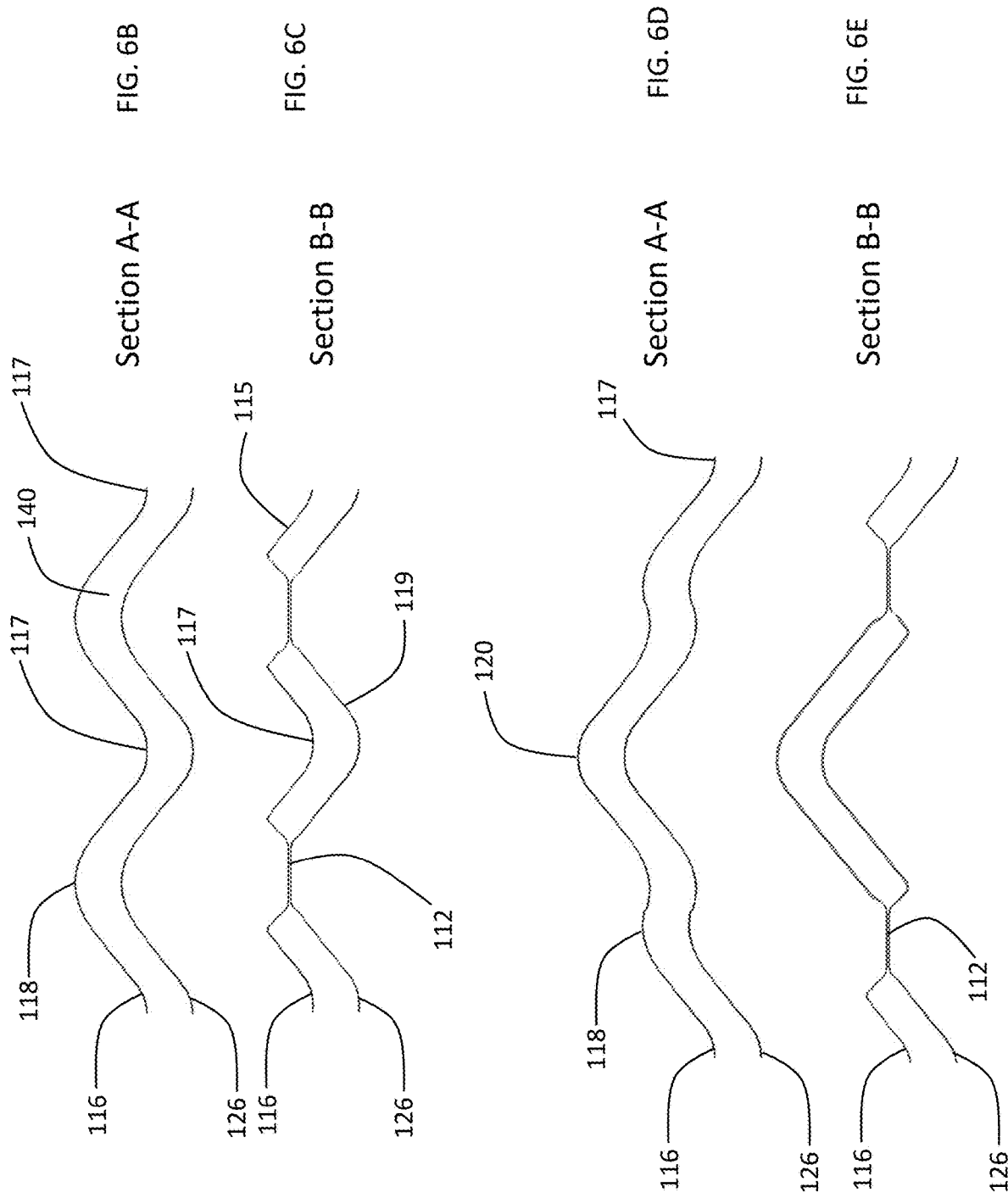

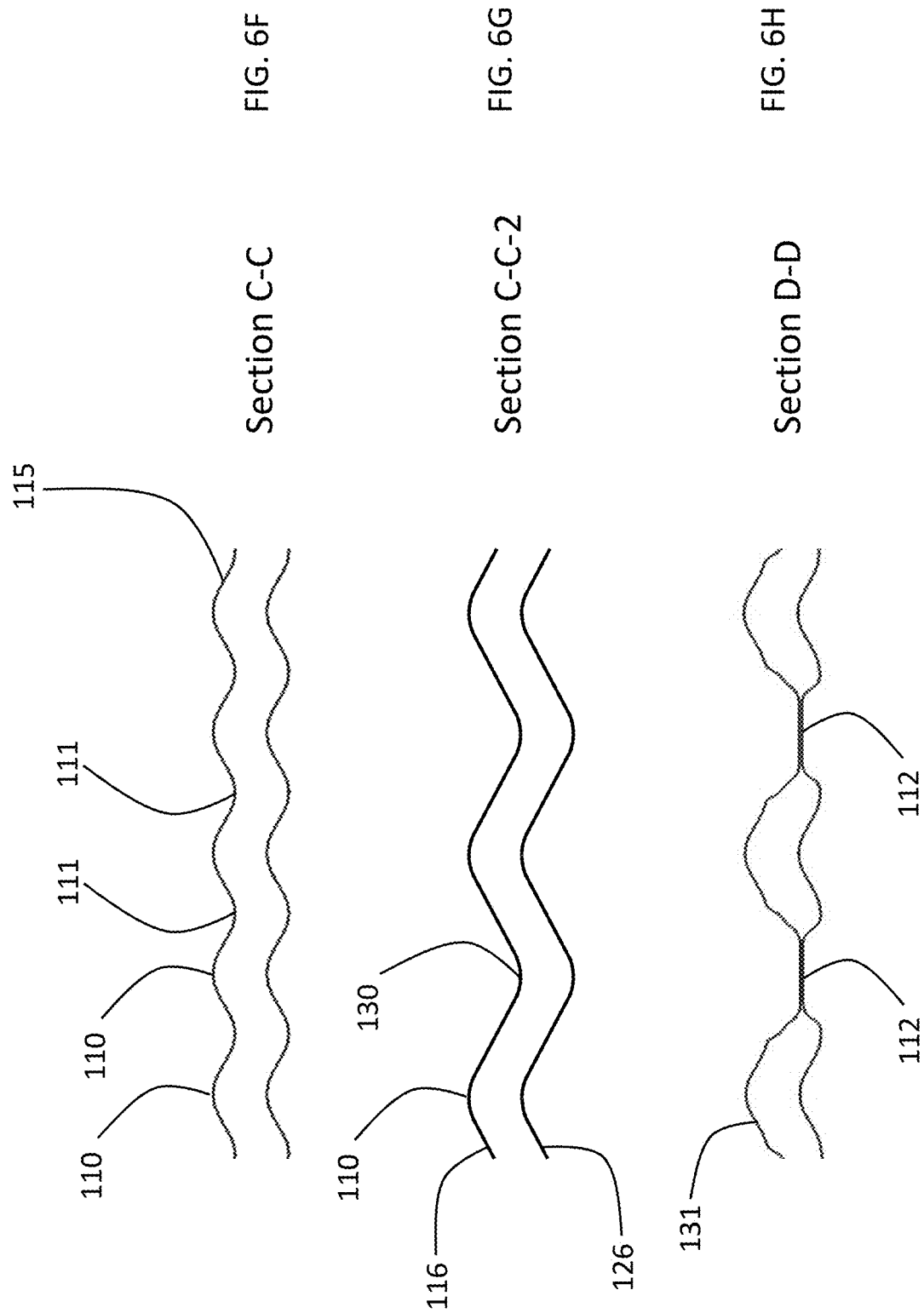

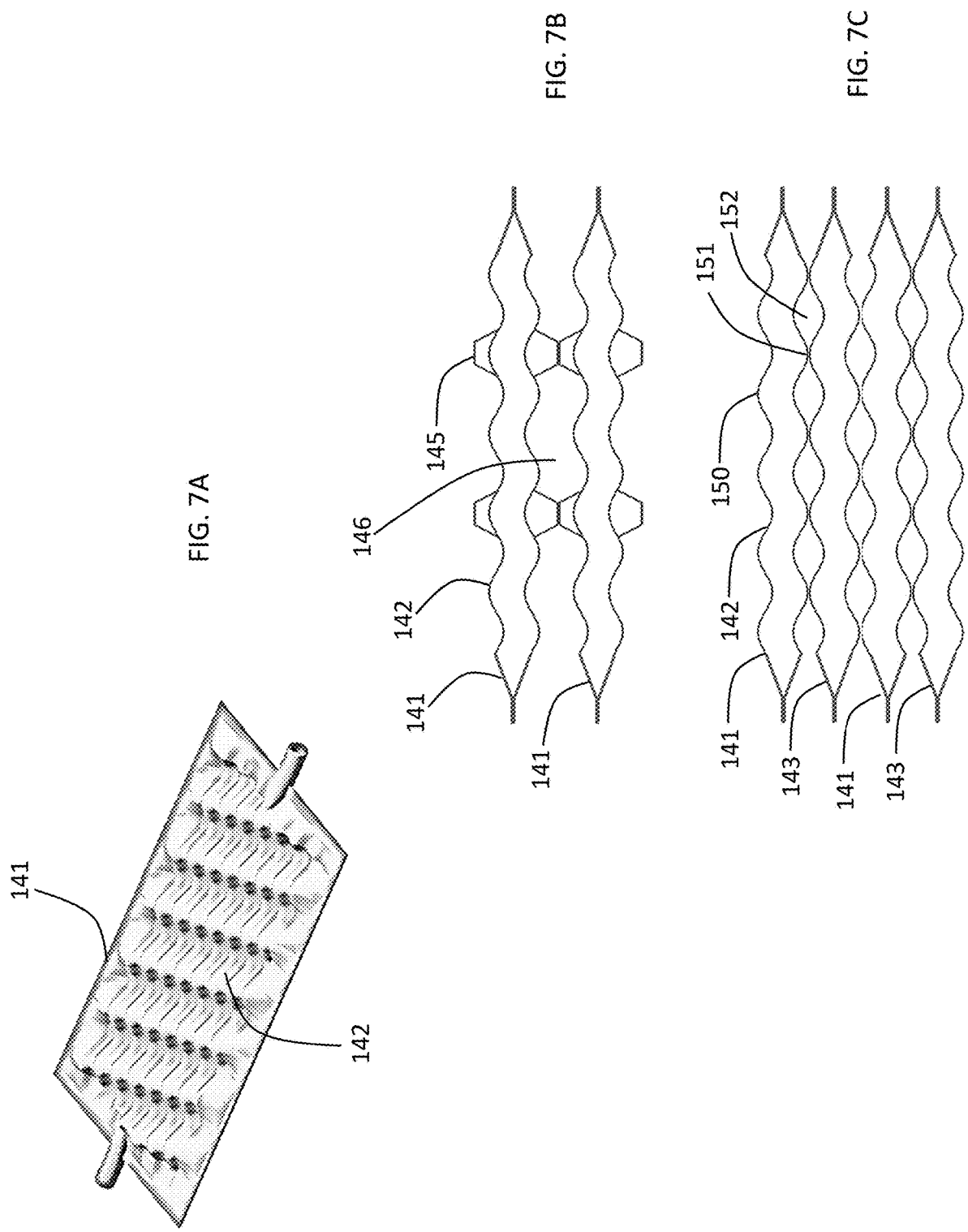

INDIRECT HEAT EXCHANGER

TECHNICAL FIELD

This application relates generally to indirect heat exchangers, such as closed circuit fluid coolers, fluid heaters, condensers, evaporators, thermal storage systems, air coolers, air heaters, and the like. More specifically, this application relates to cassette-type indirect evaporative heat exchangers.

BACKGROUND

An indirect evaporative heat exchanger is made of one or more bundles of individual cassettes stacked and connected together. Each cassette is made of two generally flat, plates formed from a thin wall of conductive material (e.g., copper, aluminum, steel, etc.), and the perimeter of the plates are sealed together so that internal fluid can flow through the cassette between an inlet and outlet without leaking through the outer edges. On the outside of the cassette, an external fluid (e.g., air, water, or combinations thereof) fluid flow over the surface of the cassette. Via this process, heat is indirectly transferred from the higher temperature fluid to the lower temperature fluid through the cassette plates.

From a heat transfer perspective, it is more efficient for cassettes to use plates having relatively thin walls, as thinner material will have a higher heat transfer rate than a thicker wall. However, from a structural perspective, thicker walls provide greater structural stability over thin walls, which can be important in situations where cassettes are subjected to relatively high levels of internal pressure.

To realize the heat transfer benefits of a thin walled cassette while avoiding the associated structural problems, cassettes may be welded together via welding lines at spots between the plates. These welding lines help hold the plates together and allow the cassette to withstand high internal pressure, but again they diminish the heat transfer capabilities because the length of the lines tend to restrict the flow rate of fluid through the cassette. Moreover, these weld lines tend not to mix the external fluid over the surface area of the cassette as well as the un-welded portions, thereby further inhibiting heat transfer performance.

SUMMARY

This application describes cassettes for use in cassette-type heat exchangers. The cassettes have an inlet and an outlet, and include an upper plate and a lower plate. The upper and lower plates are sealed together around an edge area (i.e., at least a portion of the periphery that does not include the inlet and outlet) of the cassette, thereby forming a flow path within the cassette between the inlet and outlet. The plates are formed with a stamped pattern that increases the surface area of the plates as compared to a flat plate surface. The pattern includes a series of weld points whereby the upper and lower plate are welded or bonded together at a point location.

The stamping pattern in the plates forming this configuration can result in: (1) an increase the internal and external heat transfer rate; (2) a reduced pressure drop for increased air flow rate; (3) the formation of an integrated header at a lower manufacturing cost, and (4) an improved structural rigidity that resists internal hydraulic pressure.

BRIEF DESCRIPTION OF THE DRAWINGS

FIG. 3C is a cross-sectional view of the cassette of FIG. 3A taken along line A-A.

FIG. 4A is a front view of cassette bundle for use in a heat exchanger in accordance with examples described herein.

FIG. 4B is a side view of the cassette bundle of FIG. 4A.

FIG. 4C is a side view of a variation the cassette bundle of FIGS. 4A and 4B.

FIG. 4D is a top view of a plurality of cassettes used to form a cassette bundle in accordance with examples described herein.

FIG. 4E is a top view of another plurality of cassettes used to form a cassette bundle in accordance with examples described herein.

FIG. 5A is a front view of another cassette bundle in accordance with examples described herein.

FIG. 5B is a top view of the cassette bundle of FIG. 5A.

FIGS. 6B through 6H are cross sectional side views and alternate cross sectional side views of the cassette plate of FIG. 6A taken at different locations.

FIG. 7A is an isometric view of a cassette having a cassette plate pattern in accordance with examples described herein.

FIGS. 7B and 7C are side views of cassette bundles having the cassette plate pattern of the cassette of FIG. 7A.

DETAILED DESCRIPTION

Figure 1:
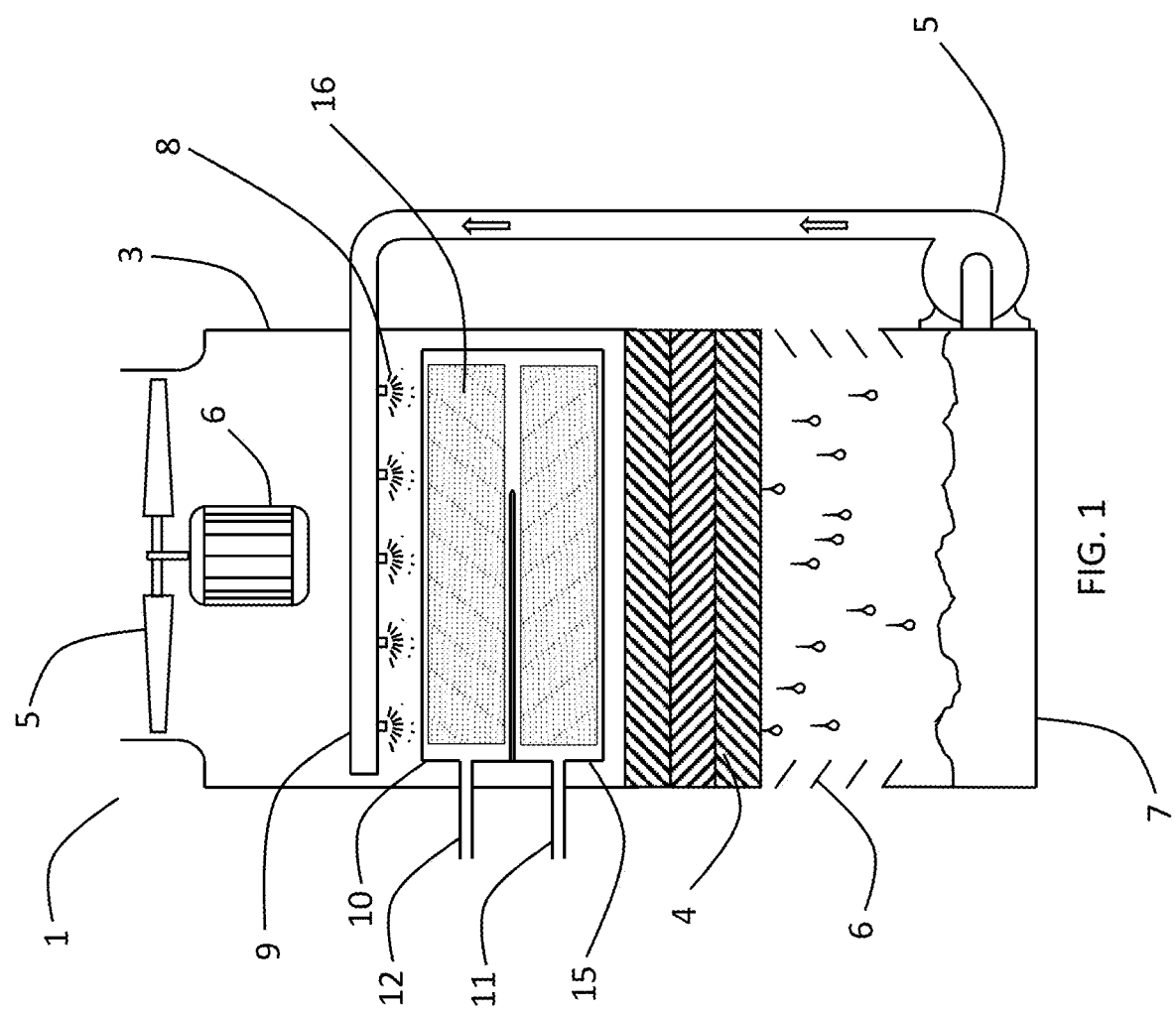
FIG. 1 is a front view of a heat exchanger in a cooling tower in accordance with examples described in this application.

This application describes an indirect heat exchanger comprising a bundle of stacked cassettes. Individual cassettes include a pair of conductive plates sealed around a periphery and forming an inlet and outlet that allows internal fluid to pass through. The plates of the cassette are formed (e.g. stamped) to have a three-dimensional surface pattern that improves the rate of internal fluid heat transfer rate without significantly increasing the pressure drop within the cassette. In some examples, the stamped pattern takes the form of two intersecting sinusoidal wave patterns. That is, the pattern may take the form of a first sinusoidal wave pattern travelling in a first direction across the cassette plate surface, and a second separate sinusoidal wave pattern travelling in a second direction, different from the first direction, across the cassette plate surface. It should be noted that throughout this application, the term "sinusoidal" refers to any wave-like oscillating pattern. The term "sinusoidal" refers to patterns that include multiple separate crests and troughs in a given oscillation, and is not intended to refer to patterns that are necessarily capable of being plotted according to a "sine" based mathematical equation. The sinusoidal patterns are generally sloping in that they have generally smooth and rounded or curved patterns without sharp angles or vertices.

The patterns applied to the described cassettes help improve the external sensible and evaporative heat transfer rate without significantly increasing the pressure drop. Further, the pattern also helps to add structural stability of the cassette and to resist deformation that can be caused by high internal pressure without increasing the thickness (and thereby reducing the heat transfer efficiency) of the cassette plates. The surface pattern is adaptable so that it can accommodate various sizes, shapes and forms of cassettes, fluid inlets, and outlets. Various examples of surface patterns that embody these improvements are described herein and shown in the Figures. The described cassettes can be formed together to form cassette bundles, which can be used in a heat exchanger device.

The cassette surface patterns can serve multiple purposes. For example, the pattern can facilitate mixing and acceleration of the internal fluid, thereby improving the convective heat transfer coefficient of the cassette. Further, the pattern can be used to increase the heat transfer surface area from a generally flat surface for a larger amount of heat transfer. In addition, the pattern can help control the mixing of the external fluid to increase both convective and evaporative heat transfer rates. Accordingly, the surface patterns can result in a combination of significant improvement in the heat transfer rate over a similar type of cassette type heat exchanger that has generally smooth and flat surface area and a significant reduction in cost because a much thinner material could be used than typical stand alone cassette type heat exchangers without surface patterns.

As noted, a cassette for a heat exchanger is formed from two plates, an upper plate and a lower plate, sealed together to form an enclosed flow path between a cassette inlet, which allows fluid to enter the cassette, and an outlet, through which fluid is discharged from the cassette. Both the upper plate and the lower plate are stamped or otherwise impressed with surface patterns. The surface patterns are generally similar, or even identical, such that they form a generally uniform thickness gap between the upper plate and the lower plate. The areas near the outer edges of both plates are tapered so that the outer edges of the plates form a contact surface that allows the two plates to be bonded, welded, or otherwise sealed together. The plate edges could be also sealed by brazing or sealed by using gaskets, hems, seams, or other sealing methods.

Typically, the center portions (i.e., the portions significantly removed from the edges) of the upper and lower plates are generally flat. This, of course, refers to the mean center-plane of the plate and not the surface of the plate, which, because of the stamped surface pattern, is necessarily not flat). However, in some examples, the plates could take on a generally curved (e.g., convex) shape, thereby forming a pillow-shaped cassette.

In one example, the surface pattern of the plates includes two different-sized, generally sinusoidal surface shapes that cross each other. When viewed from a diagonal direction to the generally internal fluid flow direction, the pattern would have a small repeating, generally sinusoidal cross sectional area with minor valleys and minor ridges. The generally sinusoidal shape could consist of all curved surfaces, a combination of curved and flat surfaces, or all flat surfaces. When viewed from a diagonal direction to the external fluid flow direction, which could generally be in either perpendicular or parallel to the internal fluid flow direction, the pattern would have a large repeating, generally sinusoidal cross sectional area with major valleys and major ridges. Such an example pattern is shown in the embodiments depicted in FIGS. 3A and 3B.

The spacing or gap between the upper plate and the lower plate is designed to be large enough for both internal fluid and some small particles to flow through and to keep internal side fluid pressure drop within reasonable design limits while being small enough to keep the internal fluid velocity high and therefore the internal heat transfer coefficients high. The gap between cassettes in a cassette bundle is selected such that a light density fluid with large volumetric flow rate such as air could be used as an external fluid allowing for reasonable external pressure drops.

The pattern also includes dimples, or flat areas where both plates contact one another for spot welds or other forms of joining (including brazing, fastening, riveting, adhering, gluing or the like) may be distributed throughout both the upper plate and the lower plate. The spot welds may be distributed evenly or in a geometric pattern. The spot welds inhibit the upper plate and the lower plate from separating as a result of internal fluid pressure or other forces. The spot welds may be formed from a plurality of ridges or valleys so that the pull force by the plates due to the internal pressure is applied evenly to the spot welds.

Each cassette has at least one internal fluid inlet and at least one internal fluid outlet. The internal fluid inlet and internal fluid outlet connections can, in some examples, be stamped directly into the plate or into a cassette, which can help reduce manufacturing costs, but in other examples, tubes or pipes could be added as separate inlet or outlet.

As noted, the patterns on the plates of the cassettes generally take on a sinusoidal pattern incorporating "waves" or deformations in the plate material that result in a bumpy or textured surface pattern. This pattern can serve a variety of purposes, thereby providing a variety of benefits over other cassettes that do not use plates having such patterns. The following describes in more detail how this generally multi-directional sinusoidal pattern design serves multiple purposes. For instance, the pattern can facilitate the mixing of the internal fluid within the cassette because one sinusoidal pattern (e.g., a wider, or "lower frequency" wave pattern) produces a more strenuous flow path than a cassette without such a pattern. This helps provide a more uniform temperature profile across the internal fluid. Specifically, it helps distribute an even temperature profile across the cross sectional area perpendicular to the internal fluid traveling direction as compared to that of an unmixed internal fluid. Having more uniform internal temperature profile increases the temperature difference between the internal fluid near the plates and plates themselves, and the larger temperature difference increases heat transfer rates. Outside the cassette, the same wider wave pattern also better mixes the fan drawn cooling air between the cassettes by channeling the air in crisscross directions. Moreover, a second sinusoidal pattern that has smaller waves (e.g., a tighter or "higher frequency" wave pattern) can serve to better distribute the flow of the exterior fluid (e.g. spray water coming down from spray nozzles), thereby enhancing heat transfer between the cassettes and the exterior fluid. The same smaller wave pattern also is used to "trip" the fan drawn cooling air at the cassette surface to increase turbulence and therefore improve the heat transfer rate.

Another benefit of the generally sinusoidal shape of the pattern is that it provides a larger heat transfer surface area for a given area compared to a generally smooth, flat stand alone cassette design. That is, the wavy pattern texture requires more material surface area than a simple flat surface, thereby allowing more area for heat transfer to take place.

Further, in some embodiments, the pattern can take on a generally sinusoidal shape in the direction that is generally parallel with the internal fluid flow and the direction that is generally perpendicular to the external fluid flow. This configuration helps resist the buildup of internal pressure inside the cassette, which can induce ballooning or expanding of the surface between the weld spots. This is because the generally sinusoidal shape functions as a cold worked structural member, thereby increasing the structural integrity or rigidity of the cassette walls and making them less likely to deform as compared to un-patterned walls. For instance, a thin plate with nominal thickness of 0.03 inch can withstand the internal pressure up to several hundred pounds per square inch without a significant deformation of the surface shape.

The patterned cassettes also provide a way to improve the mixing of the external fluid. For instance, when two cassettes are stacked together with an external fluid gap between the two cassettes, the sinusoidal pattern results in a plurality of valleys in the direction generally diagonal to the external fluid flow direction, which valleys serve as air paths that mix the external fluid, thereby resulting in a higher heat transfer rate. It should be understood that within an external fluid gap between the two cassettes, the direction of a plurality of valleys in one of the cassettes in the gap could be either in the same direction as or in the crisscross direction to another cassette's valley. An example of such a configuration is shown in FIG. 5B.

Additionally, patterns that include small repeating shapes that are generally sinusoidal in the direction of internal fluid flow helps to mix the external fluid near the surface. And because the internal fluid gap between the plates has narrow cross sectional area in the direction of external fluid flow, the external fluid can flow easily without a significant external side pressure drop.

The enclosed drawings show various examples of heat exchangers and cassettes that utilize the generally sinusoidal plate patterns discussed above. FIG. 1 is a front view of a heat exchanger having an indirect heat exchange section 10 and is shown inside of a closed circuit cooling tower 3. A direct heat exchange section 4 (an optional component) is located beneath the indirect heat exchanger 10 and may comprise fill sheets of polyvinyl chloride. Direct heat exchange section 4 receives air through air inlet 6 near the bottom of closed circuit cooling tower 3 with air being drawn generally upwardly through direct heat exchange section 4 by fan 5 rotated by motor 6.

Indirect heat exchange section 10 includes an internal fluid inlet 11 and internal fluid outlet 12 and is positioned above direct heat exchange section 4. It should be understood that the internal fluid inlet 11 and internal fluid outlet 12 can be reversed if desired and direct section 4 could be placed on top of indirect heat exchanger 10 if desired.

An evaporative fluid (e.g., water), flows downwardly from water distribution assembly 9 such that the evaporative fluid falls downwardly onto and through indirect heat exchange section 10 and then direct heat exchange section 4. While falling downwardly and through both indirect heat exchange section 10 and direct heat exchange section 4, a small portion of evaporative fluid is evaporated by moving air and latent heat transfer takes place from the evaporative fluid to air. It should be noted that in some applications, condensation takes place from air into the evaporative fluid.

The evaporative fluid that passes downwardly and through both indirect heat exchange section 10 and direct heat exchange section 4 is collected in sump 7 and is pumped by pump 5 to water distribution assembly 9. Water distribution assembly 9 can be comprised of a variety of pipes with openings, orifices, or spray nozzles or can be of other water distribution assemblies as known in the art.

In FIG. 1, indirect heat exchange section 10 is comprised of a plurality of cassette type heat exchanger 15. A fluid to be cooled, condensed, heated, or evaporated passes within the cassette type heat exchanger 15. A plurality of external gaps among cassette type heat exchangers 15 allows evaporative fluid, usually water, to flow downwardly from water distribution assembly 9 and moving air to flow through the cassettes.

While falling downwardly and through both indirect heat exchange section 10 and direct heat exchange section 4, a small portion of evaporative fluid is evaporated by moving air and latent heat transfer takes place from the evaporative cooling tower liquid to air. It should be noted that in some applications, condensation takes place from air into cooling tower liquid.

Each cassette type heat exchanger 15 has surface pattern 16 which improves both sensible and latent heat transfer efficiencies when placed in a closed circuit cooling tower 3.

It should be noted that indirect heat exchange section 10 can be operated inside a closed circuit cooling tower 3 without direct heat exchange section 4. It is further noted that when ambient air becomes cold enough, indirect heat exchange section 10 can be operated without evaporative fluid in the sensible heat transfer or dry mode. Surface pattern 16 adds surface area and significantly improves the sensible cooling characteristic of indirect heat exchange section 10 over a typical non-patterned smooth plate heat exchanger or a typical tube type heat exchanger.

Figure 2:
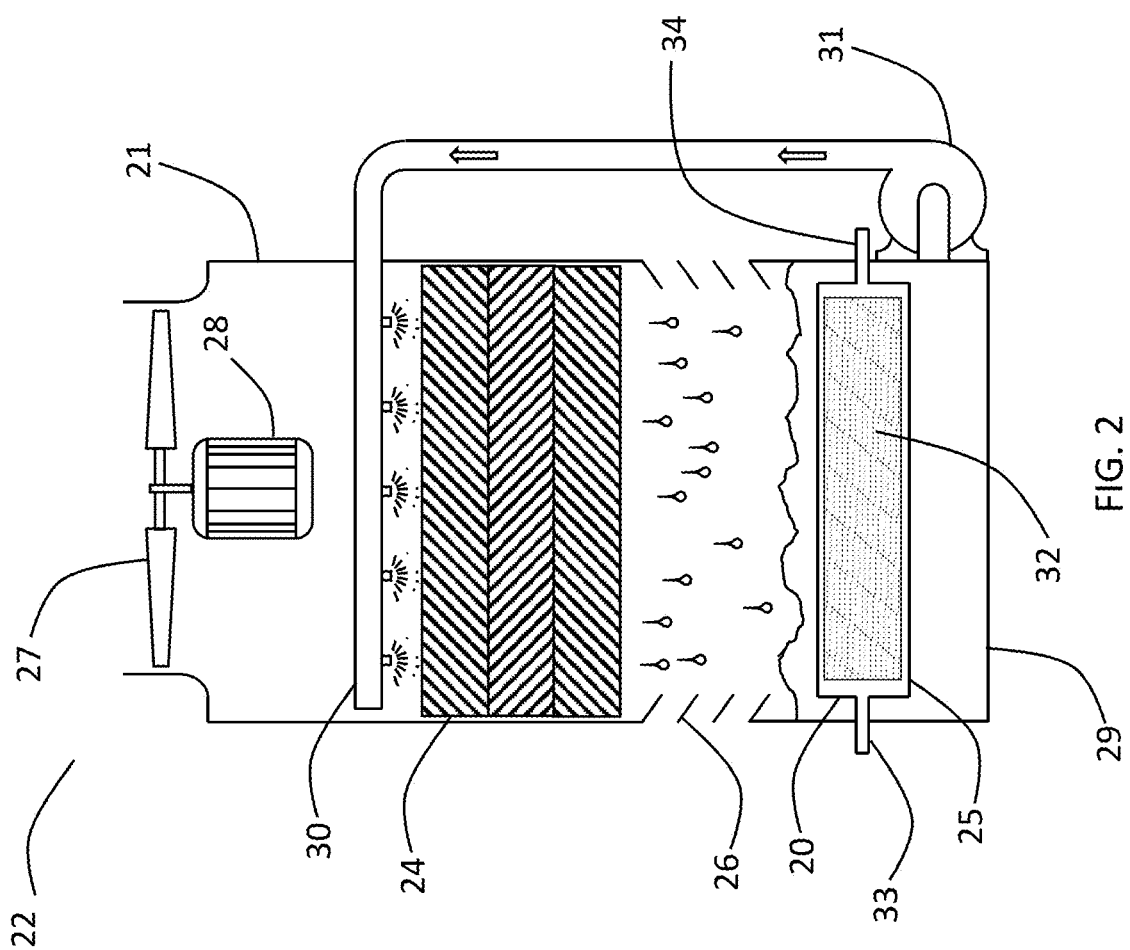
FIG. 2 is a front view of another heat exchanger in a cooling tower in accordance with examples described herein.

FIG. 2 is a front view of another heat exchanger 22 with an indirect heat exchange section 20, and is shown located in sump 29 submerged below the evaporative fluid level in a closed circuit cooling tower 21.

Direct heat exchange section 24 may comprise fill, which may comprise of sheets of polyvinyl chloride. Direct heat exchange section 24 receives air through air inlet 26 near the bottom of closed circuit cooling tower 21, with air being drawn generally upwardly through direct heat exchange section 24 by fan 27 rotated by motor 28.

Indirect heat exchange section 20 has an internal fluid inlet 33 and internal fluid outlet 34. It should be understood that the operation of internal fluid inlet 33 and internal fluid outlet 34 can be reversed if it is desired.

Evaporative fluid flows downwardly from water distribution assembly 30 such that the evaporative fluid falls downwardly onto and through direct heat exchange section 24. While falling downwardly and through direct heat exchange section 4, a small portion of evaporative fluid is evaporated by moving air and latent heat transfer takes place from the evaporative fluid to air. It should be noted that in some applications, condensation takes place from air into the evaporative fluid The evaporative liquid that passes downwardly and through direct heat exchange section 24 passes over cassette heat exchangers 20 then is collected in sump 29 and is pumped by pump 31 to water distribution assembly 30. Water distribution assembly 30 can be comprised of a variety of pipes with openings, orifices, or spray nozzles or can be of other water distribution assemblies as known in the art.

In FIG. 2, indirect heat exchange section 20 is comprised of a plurality of cassette type heat exchangers 25. Fluid to be cooled, condensed, heated, or evaporated passes within the cassette type heat exchangers 25. A plurality of external gaps between cassette type heat exchangers 25 allows evaporative fluid, usually water, in sump 29 to flow generally both downwardly and laterally across indirect heat exchange section 20, and indirect sensible heat transfer takes place between the fluid to be cooled, condensed, heated, or evaporated passes within the cassette type heat exchanger 25 and evaporative fluid.

Each cassette type heat exchanger 25 has surface pattern 32 which increases the surface area and improves heat transfer efficiencies when placed in a closed circuit cooling tower 21.

Depending on internal pressure drop requirement, size requirement, air pressure drop requirement, and heat transfer rate demands, the overall size of cassette type heat exchanger 25 could vary significantly. Also, the locations of internal fluid inlet 33 and internal fluid outlet 34 could change. The flow pathway inside cassette type heat exchanger 25 could be generally straight as shown in FIG. 2 or could have a serpentine shape as shown in FIG. 1.

Figure 3A:
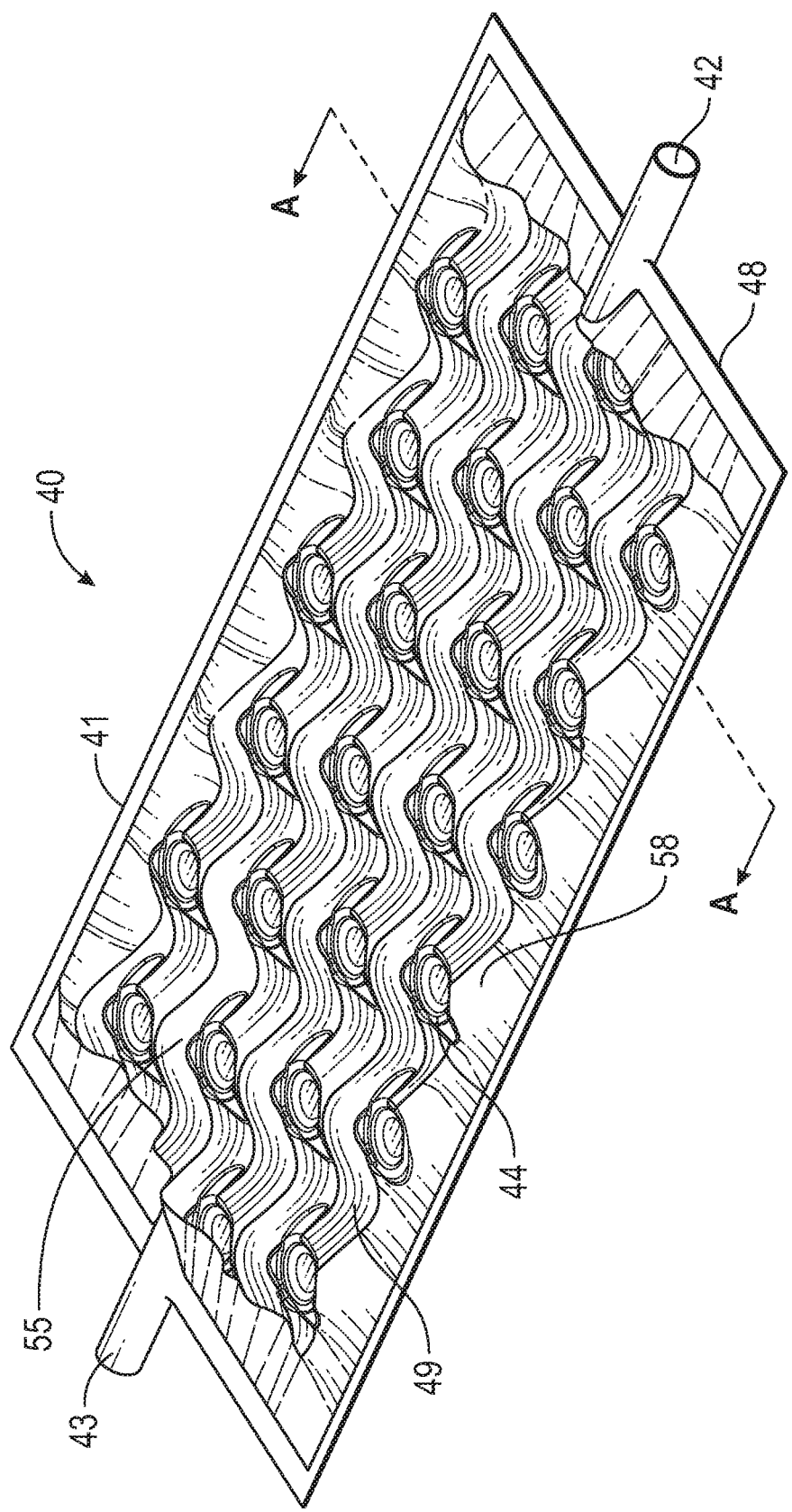
FIG. 3A is an isometric view of a cassette for use in a heat exchanger in accordance with examples described herein.
Figure 3B:
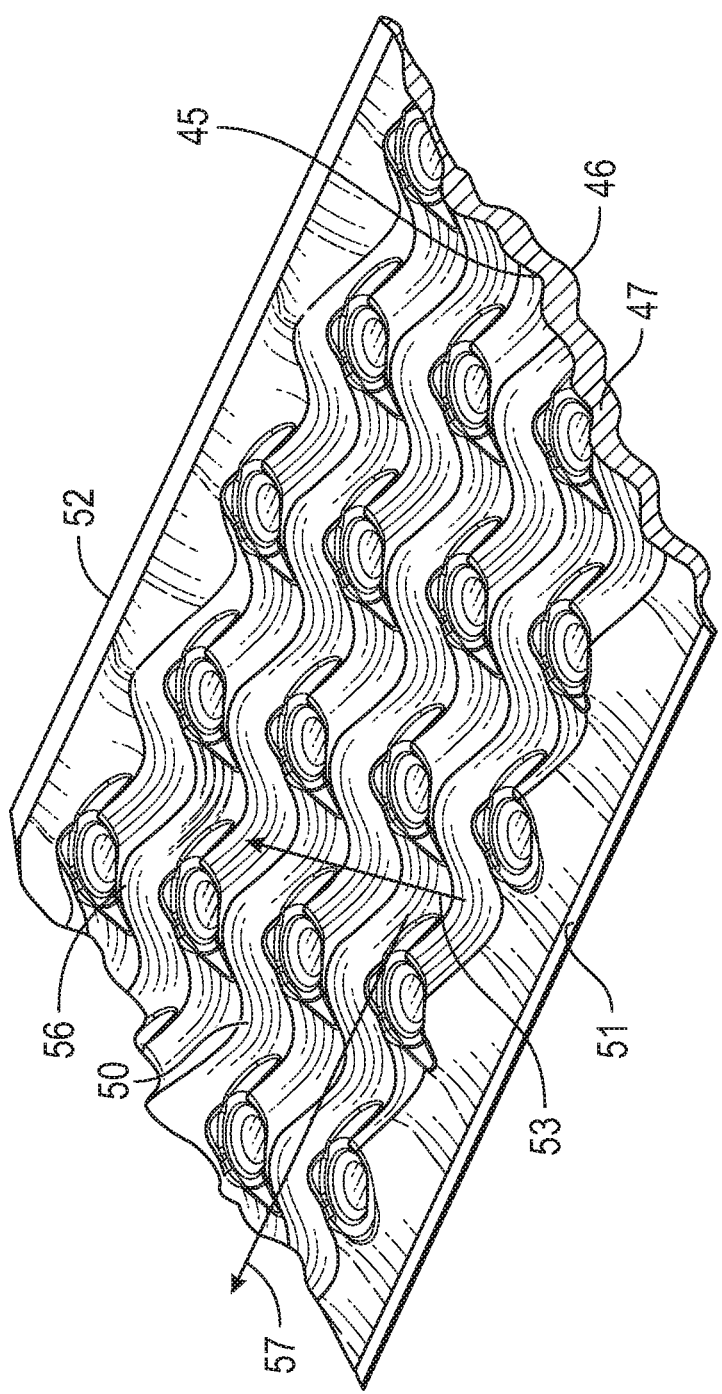
FIG. 3B is an cutaway isometric view of the cassette of FIG. 3A.

FIGS. 3A, 3B, and 3C show an indirect heat exchanger 40 in the form of a cassette 41. FIG. 3B shows a cutaway view of cassette 41. Cassette 41 is comprised of upper plate 45, lower plate 46, internal fluid inlet 42 and internal fluid outlet 43. Cassette 41 has internal fluid inlet 42 and internal fluid outlet 43. It should be understood that for each cassette 41 there could be more than one internal fluid inlet 42 and more than one internal fluid outlet 43. FIG. 3C is a cross-sectional view of the cassette 41 taken along line A-A to help demonstrate the dual sinusoidal wave pattern of the cassette.

Upper plate 45 and lower plate 46 are thin, stamped metal plates that when assembled together form gap 47 between two plates generally in the middle and touch each other at perimeter 48 and at a plurality of dimples 44. The contact areas of both perimeter 48 and dimples 44 are used to weld two plates together to form cassette 41 and make water tight seals around cassette 41. It should be understood that both upper plate 45 and lower plate 46 could also be made out of either thermoformed or injected plastic. It should be further understood that both upper plate 45 and lower plate 46 can also be glued, brazed, riveted, bolted, stapled, or fastened together or be assembled and sealed in any other method known in the art.

Inside cassette 41 is surface pattern 49 that covers most of surface of cassette 41. Between perimeter 48 and pattern 49 is transition zone 58 that gradually transitions from generally sinusoidal pattern 49 into generally straight line or flat surface of perimeter 48. Cassette 41 has a plurality of valleys 50 for external fluid, such as air, water, or air and water, to travel when the external fluid travels generally in the direction from edge 51 to edge 52. By coaxing external fluid to travel in a direction that is somewhat diagonal to the general flow direction from edge 51 to edge 52, a plurality of major valley 50 contributes to mixing of the external fluid and improves both the sensible and evaporative heat transfer rates from plate surface 49 to the external fluid. A plurality of major valleys 50 is generally aligned in the direction of major valley direction 53.

It should be understood that external fluid can also travel in the direction either from fluid inlet 42 to fluid outlet 43 or from fluid outlet 43 to fluid inlet 42 and a plurality of major valleys 50 can still contribute to mixing of external fluid and increase the heat transfer rate of cassette 41.

A plurality of dimples 44 are located near a plurality of major ridges 55 of upper plate 45 and is generally evenly spaced out throughout upper plate 45. A plurality of apexes 56 between a plurality of dimples 44 is generally in the direction of minor ridge direction 57, which is discussed more in later sections.

FIG. 4A is a front view of cassette bundle 60, including a plurality of cassettes bundled together, including cassette 61. Cassette 61 is made of two patterned plates put together to form an internal fluid passageway between two plates. As internal fluid flows inside the passageway between the top and bottom plates, a temperature difference between the internal fluid and outer fluid of cassette 61 causes heat transfer to take place through the thickness of the patterned plates.

Cassette 61 has internal fluid inlet 63 and internal fluid outlet 64. It should be understood that the internal fluid inlet 63 and internal fluid outlet 64 can be reversed if desired. All perimeter edges of cassette 61 are watertight and typically are welded. It should be understood that the perimeter edges could also be glued, brazed, sealed using gaskets or O-rings, or any other method known in the art.

Seam weld 65 is used to control the internal fluid flow direction. Seam weld 65 effectively increases the distance internal fluid needs to travel from internal fluid inlet 63 and internal fluid outlet 64 and increases the fluid flow velocity for a given flow rate and thereby increasing the convection heat transfer coefficient. There may be more than one seam weld 65 alternating sides to create a more tortuous path and is not a limitation of the invention.

The major valley direction line 66A represents the direction that is generally parallel with the lines that pass through major valley locations across waves of the pattern that travels generally upward (relative to the Figure). At the seam weld 65, the line direction changes as indicated by direction line 66B, which represents the major valley direction line on the upper portion of the cassette. The minor ridge direction lines 68A and 68B represent the lines that are generally parallel with the lines that pass through minor ridges of waves that travels generally horizontally (relative to FIG. 4A). While FIG. 4A shows one example of directional lines, it should be understood that the lines could be reversed to major valley direction 66B within cassette 61 to increase mixing of air that is both flowing over the outside surface of cassette 61 and navigating in the plurality of major valleys 67.

A typical location of one of the apexes 56 shown in FIG. 3B is shown in FIG. 4A as apex 69. A plurality of apexes 69 is located halfway between a pair of dimples 70. The line of apexes 69 is generally aligned in minor ridge direction 68A. As major valley direction 66A changes to 66B at the seam weld 65, minor ridge direction 68A can change to 68B within a cassette. It should be understood that within cassette 61, there could be multiple sections of pattern 71 and therefore multiple direction changes and multiple angles of minor ridge direction 68A and 68B and major valley direction 66A and 66B.

In some examples, the angle between a vertical line and major valley direction 66B is from about 15° to about 45°. This angle depends on the size requirement and pressure drop requirement. In general larger cassettes and lower pressure requirements prefer a smaller angle. It is also preferred that an angle between minor ridge direction 68B and a horizontal line is from about 0° to about 25°.

Minor ridge line 73 represents continuous highest points of minor ridges in generally minor ridge direction 68A. Similarly, minor valley line 74 represents continuous lowest points of minor valleys in generally minor ridge direction 68A. Note that both minor ridge line 73 and minor valley line 74 are not straight but are somewhat sinusoidal in shape. More on minor ridge line 73 and minor valley line 74 is discussed later.

FIG. 4B, shows a side view of cassette 61. Cassette 61 is generally straight when viewed from the side of cassette 61. FIG. 4C shows a side view of a variation of cassette 61, whereby the cassette 61 is generally curved when viewed from the side of cassette 61.

FIG. 4D is a top view of a cassette bundle 60 made of a plurality of cassettes 61. When viewed from the top of the bundle 60, a plurality of cassettes 61 are stacked together with a plurality of gaps 72 between cassettes 61. A generally sinusoidal pattern on the cassettes 61 creates a plurality of major valleys 67 that coaxes the mixing of air by causing some of the air to move somewhat sideways from the general direction of air flow in gaps 72.

FIG. 4E is a top view of a variation bundle 60A, which is a variation of the embodiment of FIG. 4D. When viewed from the top of heat exchanger 60A, a plurality of cassettes 61A are shown stacked together with a plurality of gaps 72A between cassettes 61A. A generally sinusoidal pattern on the curved cassette 61A creates a plurality of major valleys 67A that coaxes the mixing of air by causing some of air to move somewhat sideways from the general direction of air flow in gaps 72. Each of cassettes 61A could be curved in different ways to meet various geometrical constraint requirements that may imposed by a closed circuit cooling tower or any other structure where cassettes 61A are located.

FIGS. 5A and 5B show another cassette bundle 80 that includes another type of cassette 81. Cassette 81 is made of upper plate 94 and lower plate 95 welded together to form an internal fluid passageway between the two plates. As internal fluid flows inside the passageway, a temperature difference between the internal fluid and outer fluid of cassette 61 causes heat transfer to take place through the thickness of the patterned plates.

Cassette 81 has a raised internal fluid inlet 83 and raised internal fluid outlet 84. It should be understood that internal fluid inlet 83 and internal fluid outlet 84 can be reversed if it is desired. As shown in FIG. 5B, fluid inlet 83 and fluid outlet 84 can be welded to their adjacent fluid inlets and fluid outlets, respectively, so that these fluid inlets and fluid outlet form inlet header 85 and outlet header 86. Inlet connection pipe 97 and outlet pipe 98 can be welded or attached to fluid inlet 83 and fluid outlet 84 respectively while blank off plates 99 are welded to the opposite ends to seal off the last heat cassette in the bundle.

When multiple cassettes 81 are put together to make a bundle 87, every other cassette 81 could be rotated so that its major valley direction 88 could be crisscrossed with respect to major valley direction 88 of non-rotated cassette 81. FIG. 5B shows a top view of major valley direction 88 and crisscrossed major valley direction 89. It should be understood that fluid inlet 83 and fluid outlet 84 could be located such that every other cassette could be oriented by flipping or combination of flipping and rotating to have every other cassette 81 to have major valley direction 88 crisscrossed with respected to major valley direction 89 of non-oriented cassette 81.

A plurality of minor ridge line 90 and a plurality of minor valley line 91 are shown in FIG. 5A. Minor ridge lines 90 and minor valley lines 91 alternate due to generally sinusoidal characteristics of pattern 92 that covers most part of cassette 81. Both minor ridge lines 90 and minor valley line 91 are somewhat sinusoidal when viewed from the front of cassette 81. Minor ridge direction 93 shows that general slope of both plurality of minor ridge line 90 and plurality of minor valley line 90 has a downward angle that ranges from about 0° to about 25°.

Figure 6A:
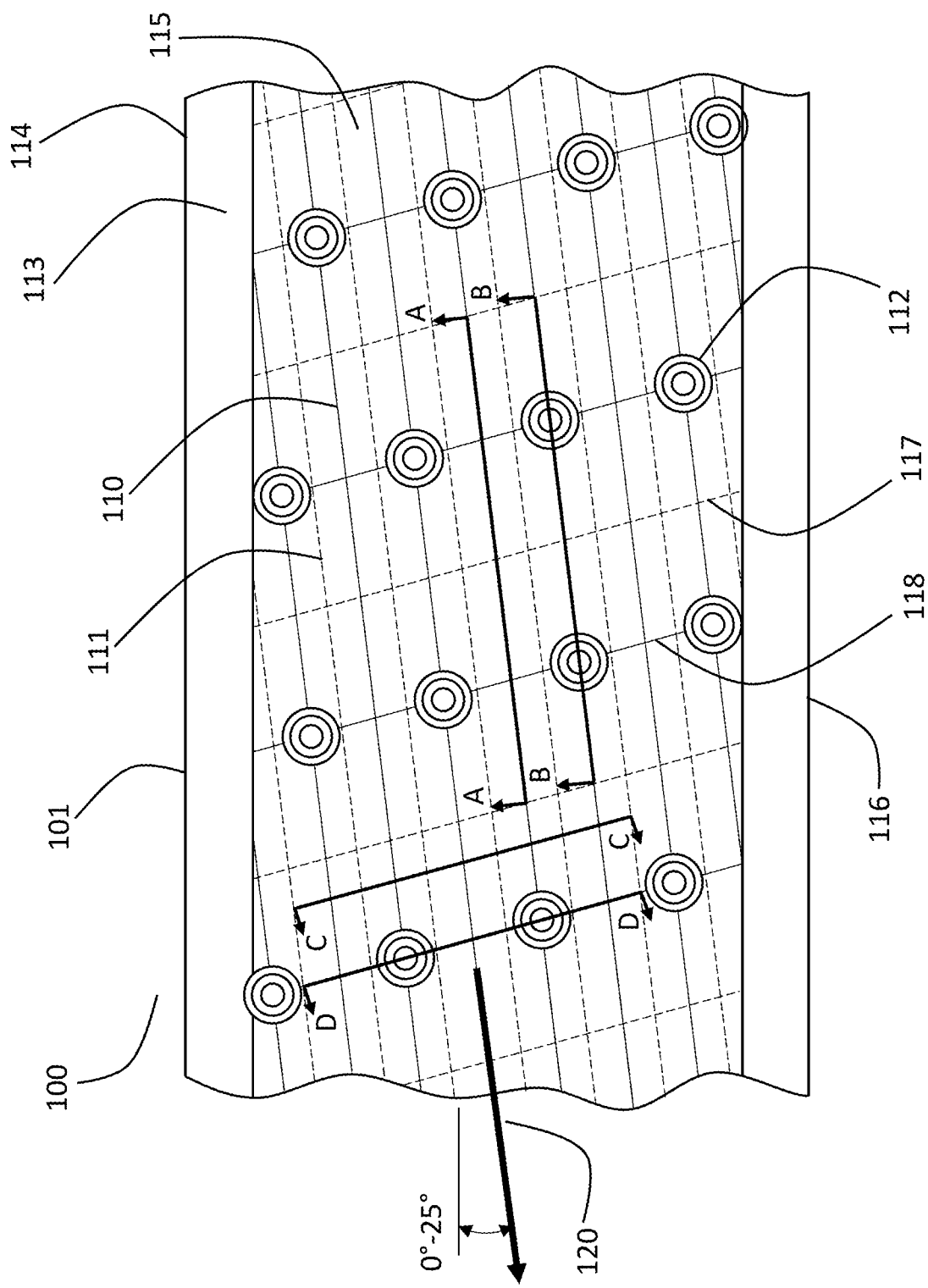
FIG. 6A is a front view of a cassette plate used to form a cassette in accordance with examples described herein.

FIG. 6A is a front view of a cassette plate 101 used to form a cassette 100 in accordance with examples described herein.

FIG. 6A is a front view of another heat exchanger device 100 in the form of a cassette section 101. A plurality of minor ridge line 110 and a plurality of minor valley line 111 are shown. Compared to fourth embodiment shown in FIG. 5A, both minor ridge line 110 and minor valley line 111 are generally straight when viewed from the front of cassette section 101.

Minor ridge direction 120 that shows the general downward slope of both plurality of minor ridge line 110 and plurality of minor valley line 111 has a downward angle that ranges from about 0° to about 25°. Transition zone 113 sits between generally sinusoidal pattern 115 and generally straight perimeter top edge 114. It should be understood that top edge 114 could also be generally curved.

A plurality of dimples 112 is spread out throughout pattern 115. A plurality of dimples 112 are spots where upper plate 116 and lower plate 126 (not shown because it is behind upper plate 116 in FIG. 6A; FIG. 5B shows similar upper plate 94 and lower plate 95) could be welded together so that upper plate 116 and lower plate 126 that form cassette 101 do not separate due to high internal pressure. A plurality of dimples 112 are spread generally evenly apart so that no one of a plurality of dimple 112 needs to resist too much of internal pressure induced separating force.

Major valley line 117 represents the continuous lowest points along a plurality of large valleys and major ridge line 118 represents the continuous highest points along a plurality of large ridges. It should be understood that a plurality major valley line 117 and a plurality of major ridge line 118 could also be curved or generally sinusoidal.

FIGS. 6B and 6C show various cross-sectional areas of cassette section 101. Specifically, FIGS. 6B and 6C show two different cross-sectional areas of major sinusoidal pattern of pattern 115. Section A-A and Section B-B of cassette section 101 show a general shape and location of a plurality of major valley lines 117 and a plurality of major ridge lines 118 with respect to each other.

Also, in Section A-A, the distance between upper plate 116 and lower plate 126 is generally uniform. Gap 140 created between upper plate 116 and lower plate 126 provides room for internal fluid to flow through. Gap 140 is maintained throughout by dimples 112 and as internal fluid weaves through gap 140, the internal fluid is both mixed and accelerated, which results in a higher internal heat transfer coefficient. At a plurality of dimples 112, upper plate 116 and lower plate 126 are welded together. It should be understood that instead of welding, upper plate 116 and lower plate 126 could also be bonded, glued, riveted, fastened together or attached together as known in the art. It should also be understood that in cases where all the cassettes are compressed and held together by thick end plates, a plurality of dimple 112 may be deleted, in which case section B-B would look very similar to Section A-A.

Even though upper plate 116 and lower plate 126 can be made of very thin plates, the plates can resist significant deformation from internal pressure. The generally sinusoidal shape 119 between a pair of dimples 112 shown in Section B-B provides strength to the plate, which can withstand high internal pressure better than had shape 119 been a generally straight line or gently curved between a pair of dimples 112. In such a situation, the generally flat surface would be more likely to balloon out.

FIGS. 6D and 6E show an alternate configuration of the cassette plate patterns taken along lines A-A and B-B. In this configuration, the general design of having upper plate 116, lower plate 126, a plurality of generally evenly spaced dimples 112, and a plurality of major ridge line 118 is maintained. The difference is that every other major valley line 117 becomes super major ridge line 120.

FIGS. 6F through 6H show two different cross-sectional areas of major sinusoidal pattern of pattern 115. Section C-C and Section D-D of cassette section 101 shows the locations of a plurality of minor valley lines 111 and a plurality of minor ridge lines 110. FIG. 6F shows one possible configuration taken along section C-C, and FIG. 6G shows an alternate configuration taken along the same location (marked as Section C-C-2).

At a plurality of dimples 112, upper plate 116 and lower plate 126 are welded together. It should be understood that instead of welding, upper plate 116 and lower plate 126 could also be bonded, glued, riveted, fastened together or attached together as known in the art. Even though upper plate 116 and lower plate 126 are made of very thin plates, generally sinusoidal shape 131 between a pair of dimples 112 shown in Section B-B resists a significant deformation of generally sinusoidal pattern 115 in the presence of high internal pressure better than had shape 131 been a generally straight line, which could have ballooned out.

In situations where the cassettes are very large or when the evaporative cooling water is dirty and can easily clog, the configuration shown in FIG. 6G (Section C-C-2) may be preferred over the FIG. 6F configuration. In this Section C-C-2 configuration, the general design of having upper plate 116, lower plate 126, and a plurality of generally evenly spaced dimples 112 is maintained. The change is that every other minor ridge line 110 becomes super minor valley line 130.

FIG. 7A is an isometric view of a cassette 141 having a cassette plate pattern 142. Cassette 141 is similar to cassette 41 shown in FIG. 3A except that cassette 141 does not have a plurality of dimples 44 shown in FIG. 3A. FIGS. 7B and 7C are side views of cassette bundles having the cassette plate pattern of the cassette of FIG. 7A.

In some examples, it may be useful for cassette patterns not to include a plurality of dimples 44 shown in FIG. 7A. For example, when the internal fluid pressure is low enough that generally sinusoidal structural pattern 142 alone is sufficient to resist the deformation of cassette 141. The second case is when a cassette or stacked cassettes are constrained from ballooning out by two relatively thick end plates that are held together by any arts available. In these cases, large gap 146 between two of abutting cassette 141 could be maintained by a plurality of spacers 145 that are stamped into structural pattern 142.

Also in these cases, if large gap 146 between cassettes is not needed as shown in FIG. 7C, a plurality of high points 150 and a plurality of low points 151 of structural pattern 142 could function as spacers and provide a plurality of fluid path 152. In order to prevent nesting of cassettes in a stack of cassettes, two different cassettes, e.g., cassette 141 and cassette 143, could be used. Another way to prevent nesting without using cassette 143 is to rotate, flip, or rotate and flip every other cassette 141 within a stack of cassette 141 so that structural patterns 142 of two abutting cassettes 141 do not align. In this way, two different cassette designs would not be needed.

This application describes preferred embodiments and examples of heat exchangers and associated cassettes, and should thus be interpreted to be illustrative and not limiting. Those skilled in the art will recognize that the described examples could be modified and/or combined with one another without departing from the scope described herein. Further, features of one embodiment or example may be combined with features of other embodiments or examples to provide still further embodiments or examples as desired. All references that this application cites, discusses, identifies, or refers to are hereby incorporated by reference in their entirety.

The invention claimed is:

1. A cassette for a heat exchanger, the cassette comprising:
an inlet;
an outlet;
an upper plate; and
a lower plate,
wherein the upper plate is welded to the lower plate around an edge area of the cassette to form a flow path within the cassette between the inlet and the outlet, the flow path extending along a longitudinal axis of the cassette, the longitudinal axis being perpendicular to a horizontal axis of the cassette,
wherein both the upper and lower plates are formed with at least one stamped pattern that increases the surface area of the plate,
wherein the at least one stamped pattern comprises a first sinusoidal wave pattern, a second sinusoidal wave pattern intersecting the first sinusoidal wave pattern, a first plurality of dimples along a first line including a first dimple and a second dimple, and a second plurality of dimples along a second line including a third dimple and a fourth dimple,
wherein the at least one stamped pattern further comprises:
a first continuous curve of the first sinusoidal wave pattern extending from the first dimple to the second dimple,
a second continuous curve of the first sinusoidal wave pattern extending from the third dimple to the fourth dimple,
a third continuous curve of the second sinusoidal wave pattern extending from the first dimple to the third dimple, and
a fourth continuous curve of the second sinusoidal wave pattern extending from the second dimple to the fourth dimple,
wherein the dimples of the upper plate are joined to the dimples of the lower plate.

2. The cassette of claim 1, wherein the first and second continuous curves each include a ridge and the third and fourth continuous curves each include a valley.

3. The cassette of claim 1, wherein the extend at first, second, third, and fourth continuous curves are without sharp angles or vertices.

4. The cassette of claim 1, wherein the first and second lines extend transversely to the longitudinal axis.

5. The cassette of claim 1, wherein the third and fourth continuous curves each include a plurality of ridges and valleys.

6. The cassette of claim 1, wherein the at least one stamped pattern comprises at least two stamped patterns and a seam weld separating the stamped patterns.

7. The cassette of claim 1, wherein the inlet comprises a raised fluid inlet portion that extends perpendicular to the upper and lower plates, and wherein the outlet comprises a raised fluid outlet portion that extends perpendicular to the upper and lower plates.

8. The cassette of claim 7, wherein the raised fluid inlet portion is configured to connect with a raised fluid inlet portion of another cassette to form a fluid inlet header of a cassette bundle, and wherein the raised fluid outlet portion is configured to connect with a raised fluid outlet portion of another cassette to form a fluid outlet header of the cassette bundle.

9. A heat exchanger comprising:
an indirect heat exchange section;

an evaporative fluid distribution assembly configured to distribute an evaporative fluid downwardly toward the indirect heat exchange section;

a sump configured to collect evaporative fluid;

a pump operable to pump evaporative fluid collected in the sump to the evaporative fluid distribution assembly;

the indirect heat exchange section comprising a plurality of cassettes bundled together, individual cassettes comprising:

an inlet;

an outlet;

an upper plate; and a lower plate;

wherein the upper plate of each of the individual cassettes is welded to the lower plate around an edge area of the cassette to form a flow path within the cassette between the inlet and the outlet, the flow path extending along a longitudinal axis of the cassette, the longitudinal axis being perpendicular to a horizontal axis of the cassette, and wherein both the upper and lower plates of each of the individual cassettes are formed with at least one pattern that increases the surface area of the plate, and wherein the at least one pattern comprises a first sinusoidal wave pattern and a second sinusoidal wave pattern intersecting the first sinusoidal wave pattern;

wherein the first and second sinusoidal wave patterns are all curves; and wherein the pattern includes welds interrupting the first and second sinusoidal wave patterns and joining the upper and lower plates together.

10. The heat exchanger of claim 9, wherein the first sinusoidal wave pattern comprises a plurality of lines of wave apexes, wherein the lines of wave apexes extend at an angle relative to the horizontal axis of the cassette, wherein the angle is between about 0° and about 25°.

11. The heat exchanger of claim 10, wherein the second sinusoidal wave pattern comprises a plurality of lines of major valleys, wherein the lines of major valleys extend at an angle relative to the longitudinal axis of the cassette, wherein the angle is between about 15° and about 45°.

12. The heat exchanger of claim 11, wherein the welds are positioned between lines of wave apexes.

13. The heat exchanger of claim 9, wherein the at least one pattern comprises at least two patterns and a seam weld separating the patterns.

14. The heat exchanger of claim 9, wherein the inlet of at least one individual cassette comprises a raised fluid inlet that extends perpendicular to the upper and lower plates, and wherein the outlet of at least one individual cassette comprises a raised fluid outlet that extends perpendicular to the upper and lower plates.

15. The heat exchanger of claim 14, wherein the raised fluid inlet portion of at least one individual cassette is connected to a raised fluid inlet portion of another individual cassette to form a fluid inlet header of the cassette bundle, and wherein the raised fluid outlet portion of at least one individual cassette is connected to a raised fluid outlet portion of another individual cassette to form a fluid outlet header of the cassette bundle.

16. The heat exchanger of claim 9, wherein the first sinusoidal wave pattern includes a plurality of minor ridges and minor valleys;

wherein the second sinusoidal wave pattern includes a plurality of major ridges and major valleys, the major ridges being larger than the minor ridges.

17. The heat exchanger of claim 16, wherein the major ridges are along major ridge lines and the major valleys are along major valley lines spaced from the major ridge lines;

wherein the minor ridges are along minor ridge lines and the minor valleys are along minor valley lines spaced from the minor ridge lines;

wherein the welds are at intersections between the major ridge lines and the minor ridge lines.

18. A heat exchanger comprising:

an indirect heat exchange section;

an evaporative fluid distribution assembly configured to distribute an evaporative fluid downwardly toward the indirect heat exchange section;

a sump configured to collect evaporative fluid;

a pump operable to pump evaporative fluid collected in the sump to the evaporative fluid distribution assembly;

the indirect heat exchange section comprising a plurality of cassettes bundled together, individual cassettes comprising:

an inlet;

an outlet;

an upper plate; and a lower plate; and wherein the upper plate of each of the individual cassettes is joined to the lower plate around an edge area of the cassette to form a flow path within the cassette between the inlet and the outlet, and wherein both the upper and lower plates of each of the individual cassettes are formed with at least one pattern that increases the surface area of the plate, and wherein the at least one pattern comprises a first sinusoidal wave pattern, a second sinusoidal wave pattern intersecting the first sinusoidal wave pattern, a first plurality of dimples along a first line including a first dimple and a second dimple, and a second plurality of dimples along a second line including a third dimple and a fourth dimple, wherein the at least one stamped pattern further comprises:

a first continuous curve of the first sinusoidal wave pattern extending from the first dimple to the second dimple, a second continuous curve of the first sinusoidal wave pattern extending from the third dimple to the fourth dimple, a third continuous curve of the second sinusoidal wave pattern extending from the first dimple to the third dimple, and a fourth continuous curve of the second sinusoidal wave pattern extending from the second dimple to the fourth dimple, wherein the dimples of the upper plate are joined to the dimples of the lower plate.

19. The heat exchanger of claim 18 wherein the first continuous curve and the second continuous curve include ridges and the third continuous curve and the fourth continuous curve include valleys.

20. The heat exchanger of claim 18 wherein the third and fourth continuous curves each include a plurality of ridges and valleys.

* * * * *